_United States Patent_ [19]

Hames

[11] Patent Number: 4,743,999

[45] Date of Patent: May 10, 1988

[54] ROTARY TELEPHONE LINE SURGE PROTECTOR AND SYSTEM

[75] Inventor: Edward L. Hames, Peterborough, N.H.

[73] Assignee: Curtis Manufacturing Company, Inc., Peterborough, N.H.

[21] Appl. No.: 14,301

[22] Filed: Feb. 13, 1987

[51] Int. Cl.⁴ ............................................. H02H 9/04
[52] U.S. Cl. ...................................... 361/56; 361/58; 361/91; 361/111; 361/119; 379/332; 379/412
[58] Field of Search ..................... 361/56, 58, 91, 111, 361/119, 118, 127, 126; 379/451, 332, 412, 438, 437

[56] References Cited

U.S. PATENT DOCUMENTS 3,873,951 3/1975 Blake ................................ 361/50 X
4,191,985 3/1980 Plillips, Jr. ...................... 361/119 X Primary Examiner—A. D. Pellinen
Assistant Examiner—Todd E. DeBoer
Attorney, Agent, or Firm—Richard P. Crowley

[57] ABSTRACT

A rotary telephone line surge protector and system in which surge protector comprises a first and second housing, the second housing containing a grounding plug and non-conductive plug prongs to connect the second housing to a standard AC electrical wall outlet and which first housing is adapted for rotary motion about the central axis of the second housing, and the second housing having a conductive grounding plate therein, and the first housing containing one or more telephone input jack receiving inlets, a surge protector circuitry means including resistors to receive and dissipate any overload voltage from the connecting telephone line, a rotary arm containing a plurality of arms for rotary movement with the first housing and the arms in a tension-biased contact with the grounding plate, the first housing in the rotary arm adapted to move about a central axis relative to the secured second housing, and telephone jack receiving inputs to receive therein any standard telephone jack to provide an incoming telephone electrical signal, the telephone input telephone jacks and the grounding plug in electrical communication through the rotary arms and grounding plate and the surge protector circuitry and thoristors to prevent any overvoltage from reaching an electronic device which is electrically connected through the telephone jack to the surge protector.

11 Claims, 3 Drawing Sheets

ROTARY TELEPHONE LINE SURGE PROTECTOR AND SYSTEM

BACKGROUND OF THE INVENTION

Surge protectors and surge surpressors are well known devices designed to clamp the resistance or to dissipate electrical surges or overvoltages in electrical lines and therefore to protect any device connected to the electrical outlet through the surge protector from surges or overvoltage occurrences. The surge protectors normally contain circuitry that responds to a rate of change of a current or voltage to prevent a rise above a predetermined value of the current or voltage and typically includes resistors, capacitors, coils, tubes and semiconductor devices. Surge protectors are employed to protect a wide variety of electrical devices, such as valuable electronic equipment, which may be damaged by overvoltage. Generally, surge protectors are adapted to be plugged into the electrical outlet between the source of electrical power and the sensitive electronic device to be protected. Various electrical devices are used and connected to telephone lines, which lines may be subject to overvoltage therefore damaging the sensitive electronic devices secured to the incoming telephone signal. Typically such devices may include, but are not limited to: modems, telephones, telexes, telecopiers, computers or other sensitive, electrically operated electronic devices.

It is desired to provide a novel rotary or swivel-type surge protector, particularly useful with telephone lines, which protector consists of and provides for a simple rotary motion of the surge protector to be adapted to various positions, which is easily positioned and may be adapted for use particularly to protect electronic devices from overvoltage in incoming telephone line signals.

SUMMARY OF THE INVENTION

The invention relates to a rotary or swivel-type surge protector particularly adapted for use with telephone line surges through sensitive electronic devices operating on telephone line signals and to a surge protector system and method which includes the rotary-type surge protector. Particularly, the invention concerns a swivel surge protector which provides telephone line surge protection for telecopiers, telexes, telephones and modems. The surge protector provides for grounding of overvoltage through a grounding plug of an ordinary electrical outlet and provides for rotary motion of an outlet portion of the surge protector so that it may be easily adjustable and positioned for a 360° swivel to receive telephone input jacks.

A rotary or swivel-type surge protector system has been discovered which surge protector comprises a first and second housing, the second housing adapted for rotary movement about a central axis of the housing relative to a first housing and typically of a 360° swivel so that an electrical cable containing an inlet means for an electrical signal, such as a telephone jack means, can be inserted in the surge protector in a variety of positions. The first housing includes an electrically conductive grounding plug typically composed of a metal, such as brass, and adapted to be inserted into the grounding receptacle of an electrical outlet, such as for example, a standard AC wall outlet. The first housing also includes a non-conductive securing means and more typically a pair of non-conductive, for example, plastic, standard plugs to secure the second housing directly to an electrical outlet so as to provide that the surge protector may be mounted directly into a standard AC wall outlet and to utilize the grounding receptacle out the wall outward to dissipate electrical charges to ground. The standard, non-conductive plastic plugs are used merely to secure the surge protector to the electrical outlet and have no electrical function. The electrically conductive grounding plate in the first housing is adapted for an electrically conductive relationship with the electrically conductive grounding prong.

The second housing includes a telephone jack or other inlet receiving means, typically to receive in an electrically communicating manner two or more telephone input jacks from an electrically conductive cable and which cable is in electrical communication with a telephone line and an incoming telephone signal, which input signal being subject to surges. The second housing also includes a surge protective circuitry means including resistors, such as metal oxide varistors, which receive and dissipate any electrical overvoltage from the incoming signal over the incoming line to dissipate said overvoltage through said grounding plug to the earth ground. The second housing also includes electrically conductive rotary arms about a central electrically conductive pin, and typically, a plurality of arms adapted for rotary movement with the movement of the first housing, the arms extending laterally outward and usually tensioned, such as spring or otherwise biased, into a frictional and electrically conductive relationship at all times with said grounding plate in the first housing. The second housing includes a central conductive pin-like means to secure the rotary arms to the first housing and to provide rotary movement about the central axis of the pin of the second housing with the first housing, the central pin means being in electrical communication with the surge protective circuitry and the thoristors.

The invention includes an electrically connected system which includes an incoming signal means, such as a telephone line, an electrical outlet which contains a grounding receptacle connected to ground earth or other grounding means and optionally, a modular jack to receive the incoming telephone line signal to provide for a patch cord leading from the telephone line, the patch cord connected to and inserted into one of the telephone inlets of the surge protector, the surge protector secured to the electrical outlet so that the grounding plug provides for grounding through the earth ground of the electrical outlet and the non-conductive plugs contain the surge protector to the outlet, an electrical cord to provide a connection between the other telephone jack inlet and the sensitive electronic device to be protected, such as, but no limited to: a modem, a telephone, a telex, a telecopier or other device to be protected from overvoltage. The surge protector permits the outer housing to be swiveled to a desired position and to receive the signal inlet, such as telephone jacks, from the incoming line, the telephone jack leading through the line to the protecting device.

In operation, the surge protector provides for any overvoltages to be dissipated through the grounding plug of the surge protector, through the grounding receptacle electrical outlet to earth ground regardless of the position of the swivable housing due to the electrical contact at all times of the rotary arms in contact with the fixed grounding plate in the housing permitting rotary movement of the electrical arms in tension-biased contact and electrical contact with the surface of the grounding plate with the rotary arms electrically connected to the central pin to the surge protected circuitry in the thoristors in the incoming telephone receiving jacks.

The invention will be described for the purposes of illustration only in connection with certain embodiments; however, it is recognized by those persons skilled in the art that various changes, modifications, additions and improvements may be made to the surge protector and the system all falling within the spirit and scope of the invention.

DESCRIPTION OF THE EMBODIMENTS

Figure 1:
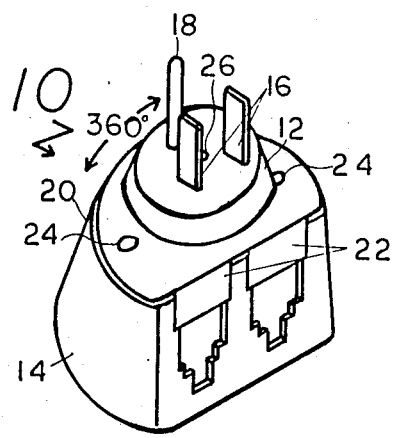
FIG. 1 is a schematic, illustrative, perspective view from above of a rotary surge protector of the invention.
Figure 2:
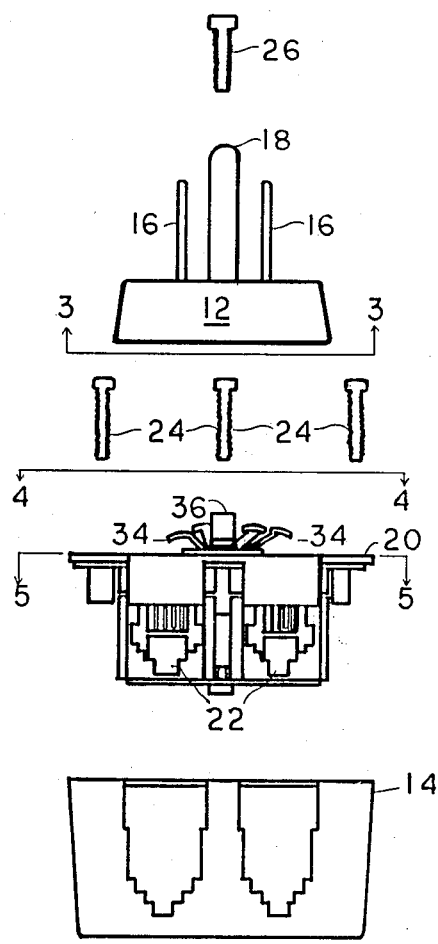
FIG. 2 is an exploded view of the surge protector of FIG. 1.
Figure 3:
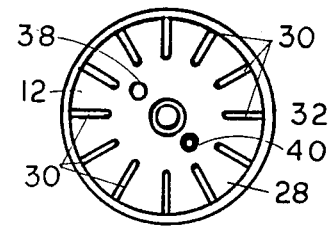
FIG. 3 is a plan view along line 3—3 of the surge protector of FIG. 2.
Figure 4:
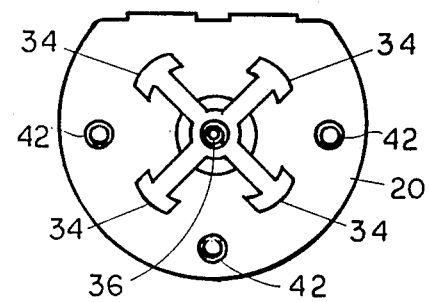
FIG. 4 is a plan view along line 4—4 of the surge protector of FIG. 2.
Figure 5:
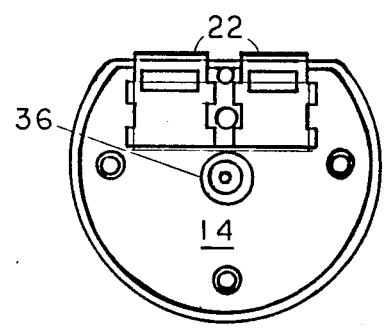
FIG. 5 is a plan view along line 5—5 of the surge protector of FIG. 2 without the surge protected circuitry illustrated.

With particular reference to FIGS. 1-6, there is shown and illustrated a swivel or rotary surge protector 10 particularly adapted for use in protecting electronic sensitive equipment from overvoltage through telephone lines; however, the surge protector 10 may also be employed for the protection of any equipment over any incoming electrical signal wherein a rotary or a swivel surge protector is desired.

The surge protector 10 comprises a first shallow plastic housing base 12, a second plastic housing 14 which includes a plastic base 20 through which the second housing 14 is secured through retaining screws 24. The first housing 12 includes two perpendicularly extended non-electrically conductive plastic leg prongs extending outwardly from the surface of the housing 12 and adapted to fit into a standard electrical AC plug outlet, not for the purposes of providing electricity, but for the purposes of securing the surge protector 10 through the base housing 12 through the electrical outlet in which first housing 12 also includes, extending therefrom, an electrically conductive, for example, brass, grounding prong 18 which is adapted to fit into the standard grounding receptacle of a standard electrical outlet. Secured to base 20, there is a pair of standard telephone jack receptacles 22 to receive standard telephone jacks; however, where the surge protector 10 is employed for protection of other signals, such jacks could be changed to accommodate types of cable used for the incoming and outgoing electrical voltage which is to be monitored by the surge protector 10.

The first housing 12 includes an electrically conductive, flat, for example, brass, grounding plate 28 secured in place to a plastic molding indent 40 and in electrical communication with the grounding plug 18 which extends through the first housing 12 and is staked to the grounding plate 28. As illustrated, the brass grounding plate 28 is characterized by a plurality of raised, short, peripheral and radially extending ridges 30. The outer periphery of the plate 32 is characterized by a center hole therein for the insertion of an electrically conductive, for example, brass, pin connector 36 which is secured by screw 26 so as to permit the second housing 14 and the base 20 to rotate about the center axis, that is, to swivel. The conductive center pin 36 is secured to a plurality of rotary extending arms 34, four arms as illustrated in this particular embodiment, the arms being tension-biased outwardly and extending so that they are in contact with the brass grounding plate 28 at all times during operation. The ridges 30 on the brass grounding plate 28 are positioned so as to provide for continuous contact with the pins of the rotary arms 34 with the ridges 30 so as to provide electrical passageway to the grounding prong 18 at all times. As illustrated more particularly in the wiring diagram 50 of FIG. 6, a pair of varistors, that is, resistance, are placed in a surge protector and circuitry, the resistors and electrical leads leading to the top of the connecting center pin 36 and with the electrical leads extending through contact with each pair of telephone inlet jack receiving connections 22.

Figure 6:
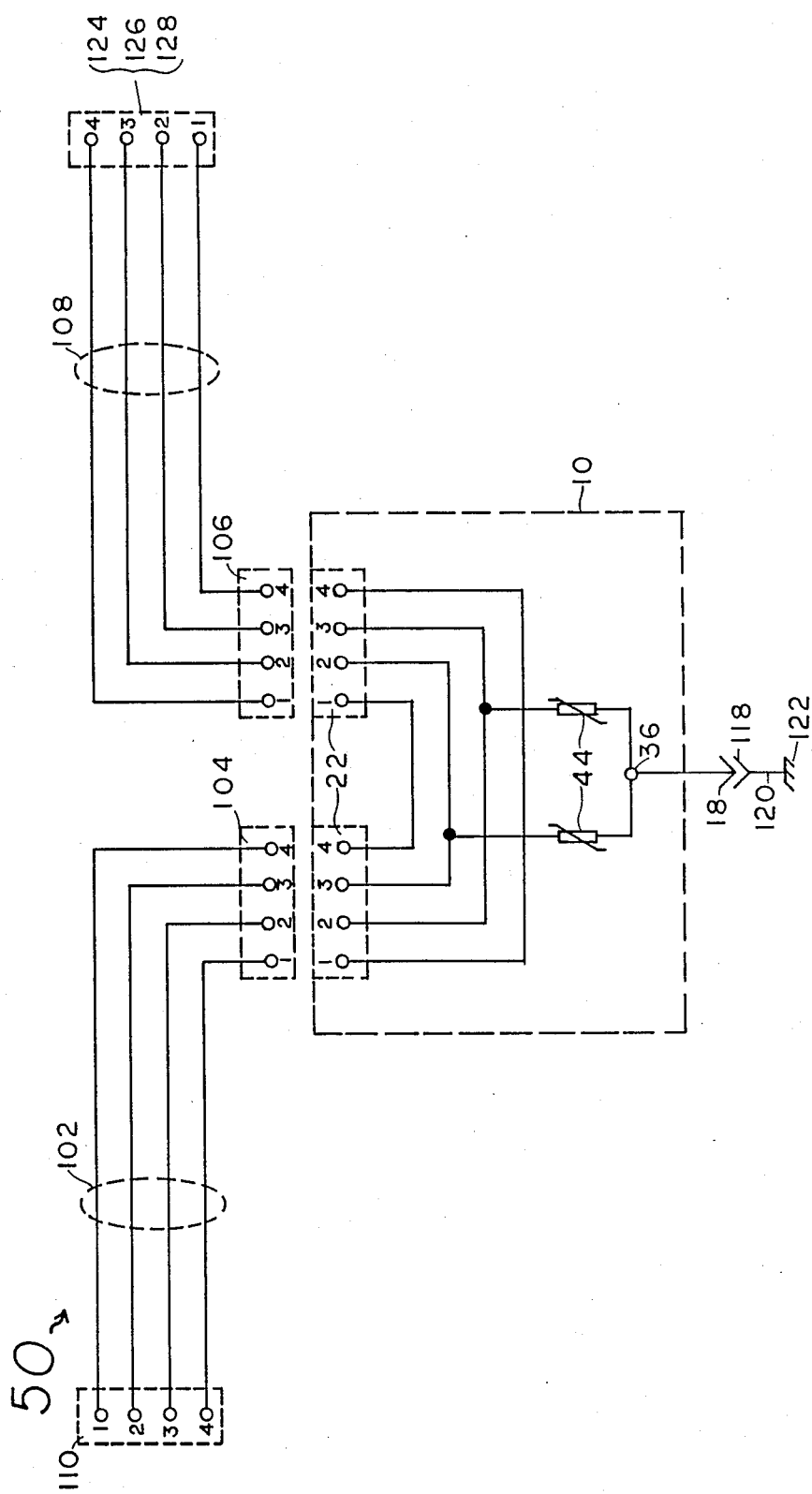
FIG. 6 is wiring diagram of the surge protected circuitry of the surge protector of FIG. 1.
Figure 7:
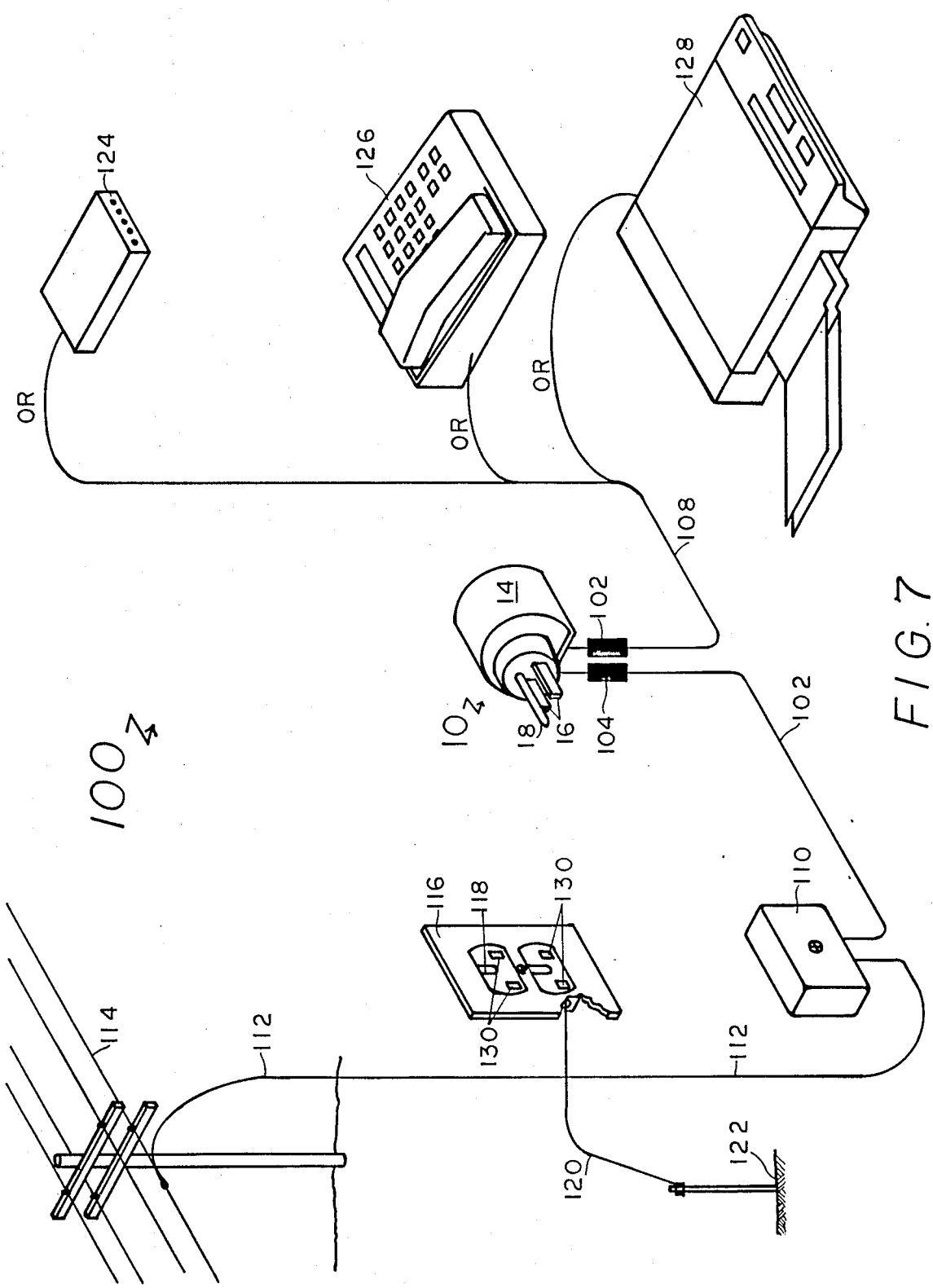
FIG. 7 is an illustrative, schematic diagram of a telephone line surge protector system containing the surge protector of FIG. 1.

With reference to FIGS. 6-7, there is shown a wiring diagram 50 in FIG. 6 and a schematic diagram of FIG. 7 illustrating the use of the surge protector 10 in connection with protecting equipment from overvoltages in an incoming telephone line. The system 100 is shown more particularly in schematic form in FIG. 7 wherein the swivel-type surge protector 10 is shown in a system with the grounding prong 18 and the two plastic securing prongs 16 to be secured to a standard AC wall outlet 116 containing a grounding plug receptacle 118 and AC wall plug receptacles 130. As illustrated, a telephone line 112 connected to a telephone system or overhead telephone lines 114 secured to a modular jack 110 and through a patch cord 102, a jack 104 at the end is inserted into one of the telephone receptacles 22 of the surge protector 10. The grounding plug 18 of the surge protector 10, when inserted in the grounding receptacle 118 of the wall outlet 116, is provided through a ground connection 120 to earth ground 122. Another connecting cord 108 containing a telephone jack 102 provides for insertion in the telephone jack receptacle 22 and is connected to the electronic device for the purposes of illustration only as illustrated in FIG. 7 as being modem 124, a telephone 126 or a telecopier 128.

As illustrated then, the surge protector 10 may be plugged into the ordinary, standard wall outlet or other standard electrical outlet and is so constructed and designed that the top housing 14 and base 20 swivel about the fixed, secured first housing 12 to a desired position so that electrical connectors may be placed in electrical receptors 22, typically, telephone jacks 102 and 104 to provide surge protection through voltage-sensitive electronic devices.

What is claimed is:
1. A rotary surge protector, which surge protector comprises in combination:
 (a) a first and a second housing, said second housing for rotary movement about a central axis with respect to the first housing;
 (b) the first housing comprising:
  (i) an electrically conductive grounding prong extending outwardly from the housing and in use to be inserted into the grounding receptacle of an electrical outlet;

(ii) a non-conductive securing means on the first housing to secure the first housing to the said electrical outlet;

(iii) an electrically conductive grounding plate about the central axis and in an electrically conductive relationship with the electrically conductive grounding prong;

(c) the second housing comprising:

(i) a plurality of signal receptacle means to receive in an electrical communicating manner a signal input jack from an incoming signal source whose signal is subject to surge protection and a signal output jack to send a surge-protected outgoing signal;

(ii) a surge protecting circuitry means to receive and dissipate any electrical overvoltage received through the receptacle means from said incoming signal source;

(iii) a plurality of electrically conductive rotary arms about the central axis for rotary movement with the movement of the second housing, the arms extending laterally outward and tension-biased into a frictional and electrically conductive relationship at all times with said grounding plate; and (iv) an electrically conductive pin means to secure the rotary arms through the second housing and extending into the central axis in the first housing to permit the rotary movement of the second housing relative to the first housing whereby any electrical incoming signal surges from an incoming line received by the receptacle means is transmitted to the surge protecting circuitry and through the rotary arms, the pin means to secure the rotary arms, the grounding plate and grounding prong to earth ground.

2. The surge protector of claim 1 wherein the electrically conductive grounding plate is characterized by a plurality of generally raised, electrically conductive ridges spaced apart about the external periphery of the grounding plate and in contact with the ends of the rotary arms.

3. The surge protector of claim 1 wherein the surge protecting circuitry means include a pair of metal oxide varistors.

4. The surge protector of claim 1 wherein the non-conductive securing means comprises a pair of integrally formed, non-conductive plastic prongs, spaced apart and extending outwardly from the first housing, the prongs to fit into the plug receptacles of a standard AC electrical outlet and with the said grounding prong to be inserted into the grounding receptacle of the same electrical outlet.

5. The surge protector of claim 1 wherein the signal receptacle means comprises telephone jack receptacle means.

6. The surge protector of claim 5 wherein signal receptacle means comprises one and another telephone jack receptacle means, one receptacle means for the receipt of an incoming telephone signal subject to overvoltage, and the other receptacle means for the transmission of a surge-protected signal from the surge protector.

7. The surge protector of claim 1, which surge protector further comprises in combination:

(a) a surge protective system;

(b) a source of telephone electric signals;

(c) an electrical communication means from the said source of telephone electric signals to telephone jack signal receptacle means of the said surge protector;

(d) an electrical outlet which includes a grounding receptacle connected to a ground and a standard plug receptacle, the grounding prong of the surge protector secured in the grounding receptacle and the securing means in the plug receptacles;

(e) a sensitive electrical device subject to damage by overvoltage of said source; and (f) the means to connect the sensitive electrical device through another telephone jack signal receptacle means to the surge protector.

8. The protector of claim 7 wherein the sensitive electrical device comprises a telephone, a modem, a telecopier or a telex device.

9. The protector of claim 7 wherein the surge protector comprises a pair of telephone jack signal receptacle means, one of such means connected by cable to the source of incoming telephone electrical signals and the other receptacle means connected by cable to the sensitive electrical device.

10. A rotary surge protector, which surge protector comprises in combination:

(a) a first and second housing, said second housing for rotary movement about a central axis with respect to the first housing;

(b) the first housing comprising:

(i) an electrically conductive grounding prong extending outwardly from the housing and to be inserted into the grounding receptacle of a standard AC electrical outlet;

(ii) a pair of non-conductive prong securing means extending outwardly from the housing and to be reinserted into the electrical outlet of said standard AC electrical outlet to secure the first housing to the outlet;

(iii) an electrically conductive grounding plate about the central axis and in an electrically conductive relationship with the electrically conductive grounding prong; and (c) the second housing comprising:

(i) a pair of telephone jack signal receptacle means, which includes a first input jack means, to receive in an electrically communicating manner an incoming telephone line signal to be monitored for overvoltage, and a second output jack means to send a surge-protected, outgoing signal;

(ii) surge-protecting circuitry means to receive and dissipate any electrical overvoltage received through the telephone jack receptacle means from the said incoming signal;

(iii) a plurality of electrically conductive rotary arms about the axis and for rotary movement with the movement of the second housing, the arms extending laterally outward and tension-biased into a frictional and electrically conductive relationship at all times with said grounding plate; and (iv) an electrically conductive pin means to secure the rotary arms at the central axis through the second housing and extending into an opening in the central axis in the first housing and secured to permit the 360° rotary movement of the second housing relative to the first housing whereby any electrical surges from an incoming signal is transmitted through the surge-protecting circuitry the rotary arms, the means to secure the rotary arms, the grounding plate, the grounding prong to earth ground.

11. The surge protector of claim 10, which surge protector further comprises in combination:
(a) the surge protective system;
(b) a source of incoming telephone electric signals;
(c) an electrical communication means from the said source of telephone electric signals to said first telephone jack signal receptacle means of the said surge protector;
(d) an electrical outlet which includes a grounding receptacle connected to a ground and a standard plug receptacle, the grounding prong of the surge protector secured in the grounding receptacle and the securing means in the plug receptacles;
(e) a sensitive electrical device subject to damage by overvoltage of said source; and
(f) the means to connect the sensitive electrical device through the second telephone jack signal receptacle means to the surge protector.

* * * * *